(No Model.)
F. W. WEISS.
DISINFECTING APPARATUS.
No. 563,825. Patented July 14, 1896.
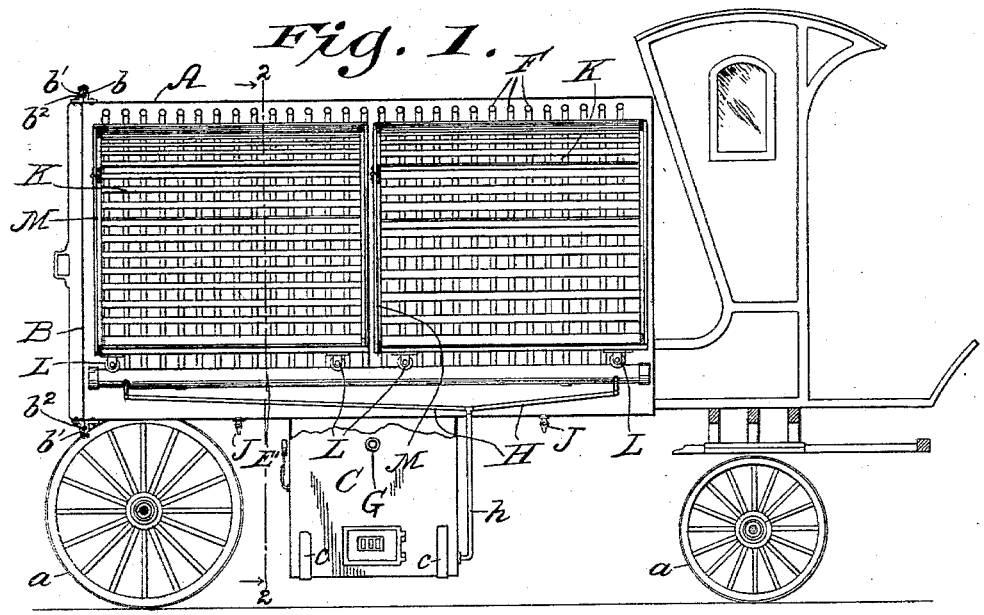
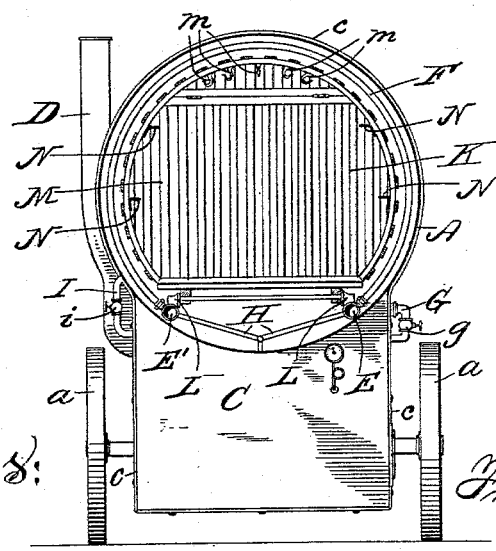
Witnesses:
Geo. W. Lowry,
M. M. Wiles
Inventor:
Frederick W. Weiss
By John E. Wiles.
Attorney

UNITED STATES PATENT OFFICE.

FREDERICK W. WEISS, OF MILWAUKEE, WISCONSIN.

DISINFECTING APPARATUS.

SPECIFICATION forming part of Letters Patent No. 563,825, dated July 14, 1896.

Application filed January 23, 1895. Serial No. 535,864. (No model.)

*To all whom it may concern:*

Be it known that I, FREDERICK W. WEISS, a citizen of the United States, residing at Milwaukee, county of Milwaukee, State of Wisconsin, have invented a certain new and useful Improvement in Disinfecting Apparatus; and I declare the following to be a full, clear, and exact description of the invention, such as will enable others skilled in the art to which it pertains to make and use the same, reference being had to the accompanying drawings, which form a part of this specification.

My invention relates to new and useful improvements in the construction of disinfecting apparatus; and it consists in the matters hereinafter described, and pointed out in the appended claim.

In the accompanying drawings, illustrating my invention, Figure 1 is a view partly in longitudinal vertical section, and partly in elevation, of a device constructed in accordance with my invention. Fig. 2 is a vertical transverse sectional view of the same.

The object of my invention is to provide a suitable casing within which articles to be disinfected may be placed, said casing being provided with a steam-tight door or closing device, and to arrange within said casing or receptacle a plurality of steam-radiating pipes suitably connected with a steam-generator, and to also connect the interior of said casing with said steam-generator in such a manner that free steam may be admitted to the interior of the casing.

Referring by letter to the drawings, A designates a suitable casing, which may be made of any convenient form and size, and which is conveniently supported upon truck-wheels $a$ $a$. I find it convenient to make the casing A in the form of a boiler-shell. At one end, conveniently the rear end, of the casing A, I provide a suitable steam-tight cover B, which is secured to the end of the casing in any desired manner—as, for instance, by means of the annular flanges $b$ $b'$, which are secured, respectively, to the end of the shell A and to the periphery of the cover B. These flanges are conveniently secured together by clamps, bolts, or screws, with a packing-ring $b^2$ interposed between the flanges to make the joint steam-tight.

Beneath the shell A is suspended a steam boiler or generator C, which may be of any suitable type, and said steam boiler or generator is conveniently supported in position beneath the shell A by means of suitable straps $c$ $c$, which are arranged to pass over the shell A and around and beneath the boiler C. A suitable smokestack or uptake D connects with the combustion-chamber of the boiler and extends upwardly past one side of the shell A, as shown in Fig. 2.

Within the shell A are provided two longitudinal headers E and E' and a plurality of curved radiating-pipes F F for connection at their opposite ends with said headers, and arranged to rest close to the inside surface of the shell A, in the manner shown.

A suitable pipe G leads from the steam boiler or generator C and communicates with the header E, so as to supply steam to the interior thereof, said pipe being provided with a regulating-valve $g$.

Inclined drain-pipes H H communicate with the headers E E' and with the return-pipe $h$, which leads back to the water-space of the boiler or generator C, so as to enable the water of condensation to be returned from the radiating-pipes and the headers to the boiler.

A pipe I leads from the steam-space of the boiler or generator C and communicates with the interior of the shell or casing A for supplying free steam thereto, and said pipe is likewise provided with a regulating-valve $i$.

Suitable petcocks or drain-valves J J are provided in the bottom of the shell or casing A, for permitting water of condensation from the free steam within said shell or casing to be drawn off.

Within the shell or casing A, I provide one or more suitable open-work cages K K for the reception of the articles to be disinfected, said cages being removably supported within the space inclosed by the radiating-pipes F F, as shown. In practice I find it convenient to provide two of such cages, each made of substantially one-half the length of the shell A, and conveniently movably supported upon a track by means of trucks or rollers L L.

In practice, I find it convenient to so arrange the headers E E' that they will serve as opposite rails of the track, and to so shape the rollers L L that they will rest evenly upon the upper surfaces of said headers, so that the cages K K may be readily moved longitudinally within the shell or casing A, or entirely removed therefrom, when desired.

At one end of each of the cages is provided a hinged door M, also of slatted or open-work construction, said door being so constructed as to be readily opened when desired, to expose the interior of the cage.

Within each of the cages, I prefer to provide a suitable number of hooks $m$ $m$, which are secured to the upper part of the open-work or slatted wall of the casing, by means of which hooks articles may be suspended within the cages.

I further provide at the sides of the cages longitudinal brackets or flanges N N, for the reception of transverse shelves, when desired, for supporting small articles within the cages.

The headers and radiating-pipes may be made from any suitable or desired kind of tubing; but in practice I find that copper tubing is very desirable for the purpose, from the fact that the copper tubing is at once very strong and light, thereby materially lessening the aggregate weight of the apparatus, and because the heat is more readily radiated from the copper tubing than from iron pipe.

In constructing the annular flanges $b$ and $b'$, which secure the cover B to the end of the shell or casing A, I may, of course, employ any suitable material; but, for the purposes of lightness and strength, I prefer to form said flanges from brass or copper.

In using my improved apparatus, articles to be disinfected are placed in the cages K K, said cages placed within the shell or casing A, and the cover B closed upon the end of the shell or casing A and secured thereto. Steam from the generator C may then be introduced to the interior of the header E and the radiating-pipes, and a dry heat thus applied to the interior of the shell or casing and the articles within the cages, or, if desired, steam may be admitted through the pipe I to the interior of the shell or casing A, and permitted to come into direct contact with the articles to be disinfected. In this manner the articles within the cages may be subjected to a sufficient degree of heat either by direct contact with the steam or by means of the heat radiated by the pipes, or both, so as to thoroughly disinfect said articles. The water of condensation will find its way through the drain-pipes H H and $h$ to the lower part of the boiler or steam-generator, and permit of a constant circulation of steam through the headers and radiating-pipes, while, by means of the petcocks or drain-valves in the bottom of the shell or casing, the water of condensation from the interior of the shell or casing may be readily drawn off so as to prevent undue moisture within the shell or casing.

By my improvement I am enabled to provide a compact form of disinfecting apparatus, which may be readily transported from place to place, as desired.

Having thus described my invention, what I claim as new, and desire to secure by Letters Patent of the United States, is—

A disinfecting apparatus comprising a suitable shell or casing, having a steam-tight door or cover, a steam-generator, headers extending longitudinally within the shell or casing, curved radiating-pipes communicating at opposite ends with said headers and arranged to extend around the inside of the shell or casing adjacent to the inner surfaces of the walls thereof, a valve-controlled connection between the steam-generator and one of said headers, a second valve-controlled connection between said steam-generator and the interior of the shell or casing, and one or more open-work cages or receptacles provided with truck-wheels arranged to engage with said headers as a track, substantially as described.

In testimony whereof I sign this specification in the presence of two witnesses.

FREDERICK W. WEISS.

Witnesses:
JOHN E. WILES,
M. M. WILES.